United States Patent
Barrick et al.

(10) Patent No.: US 11,941,398 B1
(45) Date of Patent: Mar. 26, 2024

(54) FAST MAPPER RESTORE FOR FLUSH IN PROCESSOR

(71) Applicant: INTERNATIONAL BUSINESS MACHINES CORPORATION, Armonk, NY (US)

(72) Inventors: Brian D. Barrick, Pflugerville, TX (US); Steven J. Battle, Philadelphia, PA (US); Dung Q. Nguyen, Austin, TX (US); Susan E. Eisen, Round Rock, TX (US); Cliff Kucharski, Austin, TX (US); Salma Ayub, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/061,539

(22) Filed: Dec. 5, 2022

(51) Int. Cl.
*G06F 9/30* (2018.01)
*G06F 9/38* (2018.01)
*G06F 9/48* (2006.01)

(52) U.S. Cl.
CPC ........ *G06F 9/30123* (2013.01); *G06F 9/3013* (2013.01); *G06F 9/384* (2013.01); *G06F 9/3861* (2013.01); *G06F 9/4881* (2013.01)

(58) Field of Classification Search
CPC .... G06F 9/30123; G06F 9/3013; G06F 9/384; G06F 9/3861
See application file for complete search history.

(56) References Cited

U.S. PATENT DOCUMENTS

| | | | |
|---|---|---|---|
| 10,754,553 B2 | 8/2020 | Endo | |
| 10,949,205 B2 | 3/2021 | Bowman | |
| 11,119,772 B2 | 9/2021 | Battle | |
| 11,144,364 B2 | 10/2021 | Battle | |
| 11,392,502 B2 | 7/2022 | Zhu | |
| 2005/0120192 A1* | 6/2005 | Akkary | G06F 9/3844 712/E9.061 |

(Continued)

FOREIGN PATENT DOCUMENTS

| CN | 1114600080 A | 6/2022 |
|---|---|---|
| CN | 114761921 A | 7/2022 |

OTHER PUBLICATIONS

Cui et. al., "Hotrestore: A Fast Restore System for Virtual Machine Cluster," The Institute of Advanced Computing Technology, ACT Lab, Beihang University, Nov. 12, 2014, 27 pgs.

(Continued)

*Primary Examiner* — Jacob Petranek
(74) *Attorney, Agent, or Firm* — Caleb D. Wilkes

(57) ABSTRACT

A method for restoring a mapper of a processor core includes saving first information in a staging latch. The first information represents a newly dispatched first instruction of the processor core and is saved in an entry latch of a save-and-restore buffer. In response to reception of a flush command of the processor core, the restoration of the mapper is begun with the first information from the staging latch without waiting for a comparison of a flush tag of the flush command with the entry latch of the save-and-restore buffer. A processor core configured to perform the method described above is also provided. A processor core is also provided that includes a dispatch, a mapper, a save-and-restore buffer that includes entry latches and is connected to the mapper via at least one pipeline, and a register disposed in the at least one pipeline.

20 Claims, 6 Drawing Sheets

(56) References Cited

U.S. PATENT DOCUMENTS

| | | | |
|---|---|---|---|
| 2008/0195850 A1 | 8/2008 | Abernathy | |
| 2018/0300151 A1* | 10/2018 | Gschwind | G06F 9/461 |
| 2018/0336037 A1* | 11/2018 | Barrick | G06F 9/30116 |
| 2020/0183701 A1* | 6/2020 | Battle | G06F 9/3863 |
| 2020/0241931 A1* | 7/2020 | Battle | G06F 9/30105 |
| 2020/0341767 A1 | 10/2020 | Battle | |
| 2020/0401408 A1* | 12/2020 | Burky | G06F 9/3863 |
| 2022/0043653 A1 | 2/2022 | Acharya | |
| 2022/0391214 A1 | 12/2022 | Eyole | |

OTHER PUBLICATIONS

Disclosed Anonymously, "Fast Distributed History Buffer Restore of Partially Written Data to a GPR in a Multi-Slice Microprocessor," IP.com Prior Art Database Technical Disclosure, IP.com No. IPCOM000250304D, Jun. 26, 2017, 6 pgs.

Disclosed Anonymously, "Mapper Recovery and Millicode Register Deallocation," IP.com Prior Art Database Technical Disclosure, IP.com No. IPCOM000256698D, Dec. 20, 2018, 9 pgs.

Disclosed Anonymously, "Speculative Restore of History Buffer in a Microprocessor," Prior Art Database Technical Disclosure, IP.com No. IPCOM000250357D, Jul. 5, 2017, 6 pgs.

Tessarolo, "Improved Context Save/Restore Performance and Interrupt Latency for ISRs Written in C", TMS320 DSP Designer's Notebook, Application Brief: SPRA232, Texas Instruments, Digital Signal Processing Products, Semiconductor Group, May 1994, 9 pgs.

Zhang et. al., "Fast Restore of Checkpointed Memory Using Working Set Estimation," VMware, Inc., Oct. 7, 2012, total 3 pages: 2 pages of paper source/date documentation and 1 page of disclosure.

International Searching Authority, "International Search Report and Written Opinion of the International Searching Authority", International Application No. PCT/CN2023/132295, dated Jan. 31, 2024, 8 pages.

* cited by examiner

FAST MAPPER RESTORE FOR FLUSH IN PROCESSOR

BACKGROUND

The present invention relates generally to processors that are used in computer systems and that read and execute software code that is input into the processors. Such processors are used on computer chips that are implemented in computer systems such as personal computers, servers, and/or other computers. Processors execute software code via accessing instructions from the code and carrying out the instructions.

In processor designs, mappings, i.e., logical-to-physical mappings, are read out of a mapper as requested by instructions that are dispatched. The mapper will also provide a new physical mapping for logical destinations requested by the instruction. Dispatched instructions write into the mapper, and this writing into the mapper causes the prior mapper state to be written into a save-and-restore buffer (SRB) for safe keeping. This saving of the prior mapper state is for use in case the instructions are flushed out before the instructions can be completed. Flushing of instructions may be required due to a branch misprediction or an exception event. When the instructions are flushed, the flushed destination in the mapper must be restored to a previous state that the mapper held prior to the flushing. This restoration is a step back to a correct state to allow proper execution of the instructions. This restoration must occur before the dispatching of new instructions can resume. A race condition occurs between (1) newly re-fetched instructions coming down from an I-cache after a flush and (2) the save-and-restore buffer restoring the mapper to its previous state. If the restoration of the previous destinations to the mapper takes too long, the new instructions coming down from the I-cache will need to stall at dispatch until the mapper is fully restored. This stalling at the dispatch hurts processing performance.

In the article "Speculative Restore of History Buffer in a Microprocessor" from ip.com (ip.com Number: IPCOM000250357D), a register recovery pipeline is disclosed that includes checking every entry in a history buffer when a branch-flush is encountered to determine its evictor has been flushed. If the evictor has been flushed, then the prior producer instruction tag data must be recovered. If the evictor is younger than the flush and the producer entry instruction tag is older than the flush, then the entry is restored. The collection of entries may set a status bit. An entry may be selected out of restore-pending entries. The entry to the issue queue and to the mapper are broadcast to recover the data and the instruction tag back to the register file.

The process of this ip.com article improves the save-and-restore buffer latency but does so by speculating the full flush handling.

Speeding up the save-and-restore buffer has additionally been achieved by adding additional restore ports to the mapper.

Adding more restore ports is, however, expensive in terms of power and congestion.

SUMMARY

A method for restoring a mapper of a processor core is provided. First information is saved in a staging latch. The first information represents a newly dispatched first instruction of the processor core. The first information is also saved in an entry latch of a save-and-restore buffer of the processor core. In response to reception of a flush command of the processor core, the restoration of the mapper is begun waiting the first information from the staging latch without waiting for a comparison of a flush tag of the flush command with the entry latch of the save-and-restore buffer. A processor core configured to perform the above method is also provided.

With these embodiments, a new way of speeding up the restore after a flush is provided which avoids having to add additional expensive restore ports. With these embodiments, the restore latency is improved with a low overhead mechanism.

In another embodiment, a processor core is provided that includes a dispatch, a mapper, a save-and-restore buffer that includes entry latches and is connected to the mapper via at least one pipeline, and a first register disposed in the at least one pipeline. The processor core is configured to save first information in the register. The first information represents a first instruction that is newly dispatched from the dispatch. The processor core is also configured to save the first information in the entry latches of the save-and-restore buffer. The processor is also configured so that in response to reception of a flush command for the processor core, the first information saved in the first register in the at least one pipeline is used to restore the first instruction in the mapper.

With this embodiment, restore after a flush is sped up in a manner which avoids a requirement to add additional expensive wires between design entities for the restore ports. With these embodiments, the restore latency is improved with a low overhead mechanism.

In at least some further embodiments, in response to dispatch of a second instruction after the dispatch of the first instruction, the first information is transferred from the staging latch into another staging latch, second information representing the second instruction is saved in the staging latch, and the second information is saved in another entry latch of the save-and-restore buffer. In further response to the reception of the flush command of the processor core, the restoration of the mapper is also proceeded with the second information from the staging latch without waiting for a comparison of the flush tag of the flush command with the other entry latch of the save-and-restore buffer.

With this embodiments, restore after a flush may be sped up by at least two processor cycles. This speeding up by two processor cycles allows restore latency to be improved without adding additional expensive restore ports, e.g., without adding additional wires running between the design elements.

In at least some further embodiments, the transferring of the first information from the staging latch into the other staging latch occurs in a direction against a mapper restore direction of a restore pipe.

With these further embodiments, the greatest assumption of relevancy to mapper restore may be placed on a most recently dispatched instruction instead of on a second-most recently dispatched instruction.

In at least some further embodiments, in further response to the reception of the flush command, the first information is marked in the entry latch of the save-and-restore buffer as restore done.

With these embodiments, redundant restore actions may be avoided which can help reduce or eliminate unnecessary energy expenditure for the processor core during a flush restore process.

In at least some further embodiments, in response to a completion of a flush corresponding to the flush command or to a completion of the first information in the mapper, the first information is cleared from the staging latch.

With these embodiments, accuracy of an expedited flush restore may be improved when the mapper is restored to a pre-error state.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
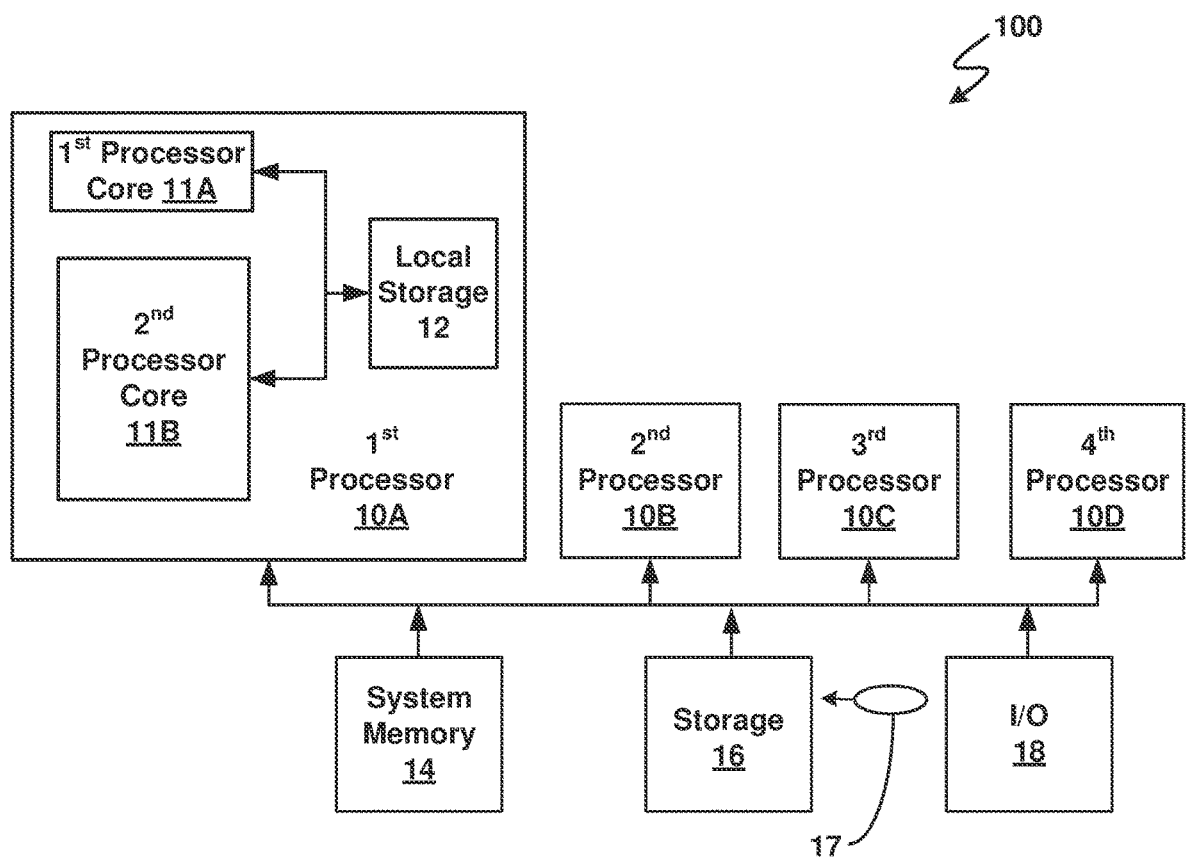
FIG. 1 is a block diagram illustrating a processing system in accordance with at least one embodiment.

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a processor, a computer system, and a method for operation of a processor which increase latency of a restore process that is associated with a flush and, therefore, which increases overall computer processing speeds. The restore with a save-and-restore buffer is sped up due to a design advancement based on the observation that instructions that are most recently dispatched are most likely to be flushed. By restoring the most recently dispatched instructions first, without having to compare instruction tags to entry latches of the save-and-restore buffer, the time required for a flush restore is reduced. This speculative restore process may speed up the save-and-restore buffer by one or more cycles, e.g., by two or more cycles, from the flush. These cycles may refer to processor core clock cycles. The expedited flush restore may allow one or more cycles of dispatch holding to be avoided.

This latency speed enhancement may be achieved by saving newly dispatched instructions in one or more staging latches, e.g., in a series of staging latches for two cycles, while these instructions are also being written into the entry latches of the save-and-restore buffer. These staging latches are part of and/or next to the restore pipe between the entry latches of the save-and-restore buffer and the mapper. The staging latches may be examples of a respective register state. These staging latches may be latches of a flush plus one cycle and a flush plus two cycle. When a flush occurs, instructions from these staging latches are compared with a flushed mask to determine if these instructions are being flushed or not. Flushed instructions identified from these stages will be restored first, while the rest of the destinations in the entry latches of the save-and-restore buffer are being processed for restoring. The instructions to be restored from these stages will be multiplexed into the buffer restore ports without having to compare to the instruction tags from the entry latches of the save-and-restore buffer. Thereby, the restore process of the mapper may begin one or more cycles earlier. This use of most recently dispatched instructions in these staging latches prioritizes, in the flush restore process, the information representing one or more instructions that were most recently dispatched. The staging latches represent secondary backup entries which sit closer to and/or in the restore pipeline.

The expedited flush saves the time that had previously been taken to select the correct instruction from a save-and-restore buffer and to pipe the selected instruction down to the correct stages of a restore pipeline. Information from recently dispatched instructions is used to populate the correct beginning action stages of the restore pipeline before a flush command is received. The traditional flush compare may be used to identify later instructions for finishing the flush restore instead of identifying the recently dispatched instructions. In the expedited path, the first dispatch cycle may be implemented in the traditional flush+3 cycle of the restore pipeline. The entry with the restore information may be read from the save-and-restore buffer in parallel with the determination of whether the restore is needed. Further in the expedited path, information from additional staging latches may in an expedited manner queue up to move to the position of the traditional flush+3 cycle and compare with the flush information in parallel. Thus, the traditional later stages of the flush restore process are reached and performed more quickly with the embodiments of the present disclosure. By allowing for earlier processing of most recently dispatched instructions, the embodiments of the present disclosure compensate for the constraint of processing one instruction per pipe per cycle. The earlier processing occurs via providing a new storage location for instruction information that is also stored in entry latches of the save-and-restore buffer.

Instructions restored from these staging latches of the expedited path are in at least some embodiments marked in the save-and-restore buffer as "restore done" in order to prevent these instructions from restoring again. Such an attempt at a duplicative restoration would be redundant and slow down the restoration process.

On dispatch, in at least some embodiments the processor core of the present disclosure may write into an entry of the save-and-restore buffer an entry that was evicted from the mapper. The save-and-restore buffer address of this entry is written into the restore pipe for the slice to which this entry was dispatched if the entry is not flushing/restoring the other thread at the same time. The thread ID is also stored with the entry data in the restore pipe. The SRB address and a valid bit is written into a staging latch that is part of the main path Flush+2 cycle stage. This information in the staging latch may be accessed without waiting for the traditional initial confirmation lookups without adding much new state. This information may be used to write into the restore latches associated with the entry location. In an embodiment with two staging latches, upon each new dispatch the dispatch information from the first staging latch may be pipelined into a second staging latch. The staging latch entries may be cleared as normal after a flush.

On a flush, in at least some embodiments the processor core described in the present disclosure detects whether the same thread is being flushed. If the flush is for a different thread, this particular staging latch will not be used for restoration of the mapper. If the processor core is flushing the same thread and if the restore address is valid, the processor core uses the data from the staging latches to retrieve the correct information from the entry latches of the save-and-restore buffer and then drives the retrieved information to the next stage, e.g., the output latches, of the save-and-restore buffer restore pipe. If this stage of the mapper restore is active and looking up entries, in some embodiments the new dispatch from the saving latches is given priority. The priority is design specific. If the flush restore pipeline is currently active on a known restore, the existing known restore would have priority over the newly dispatched restore operation.

On completion of an instruction whose information is held in one or more staging latches as described herein, in at least some embodiments the processor core of the present disclosure clears the instruction information sitting in the one or more involved staging latches in order to prevent these instructions from restoring during a flush. This clearing may occur via altering the valid bit to indicate invalid information.

The present embodiments help achieve a faster mapper restore and, therefore, improve processing speed. Thus, a computer system with at least one of the improved processors described herein more quickly executes and performs a flush restore to reinstate correct order and information of instructions in the mapper. With this improved mapper restore, the described embodiments may improve processing performance and processing speed for computer processors.

Figure 2:
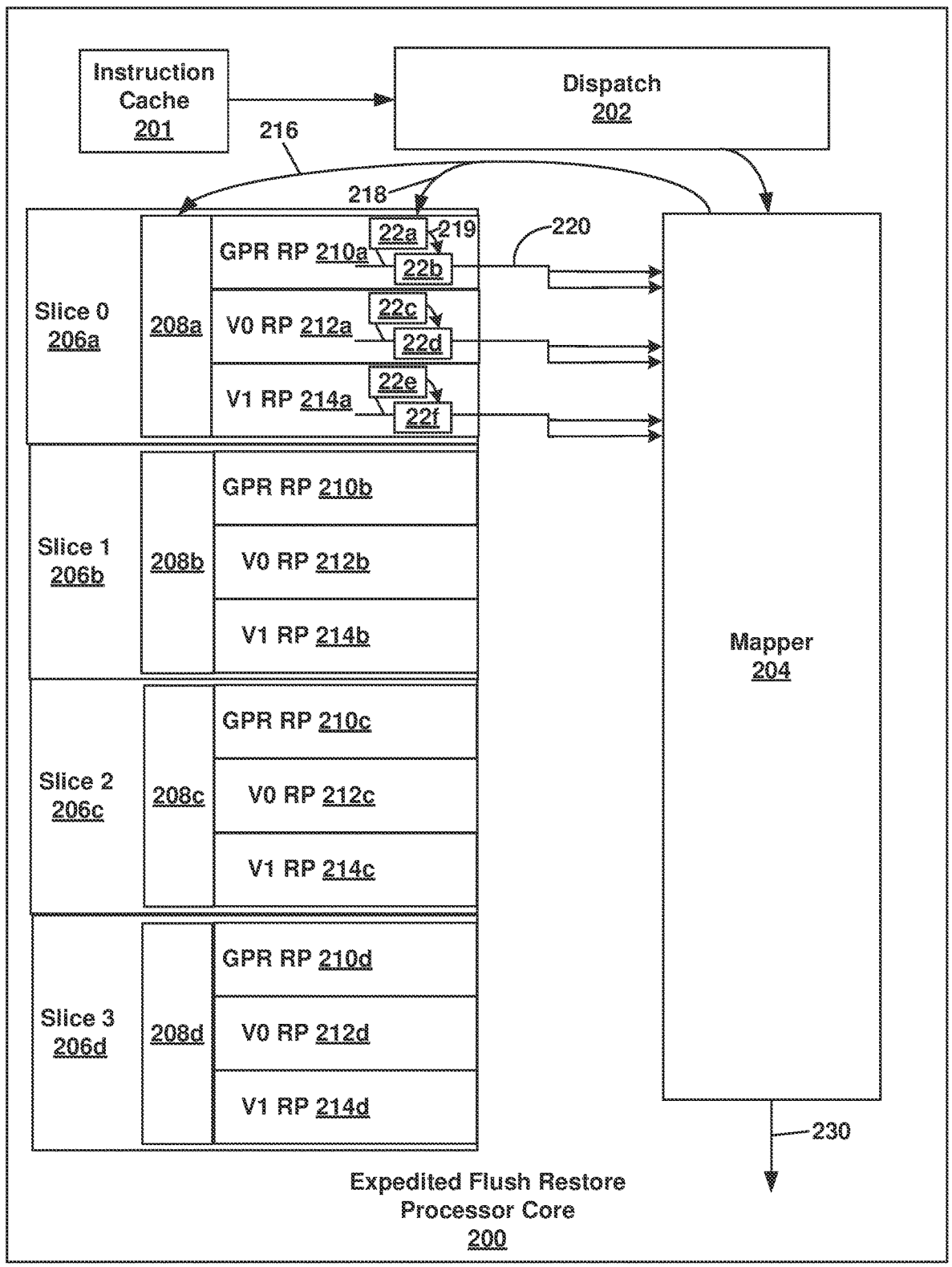
FIG. 2 is a block diagram illustrating portions of an expedited flush restore processor core in accordance with at least one embodiment and that may be implemented in one or more of the processors of the processing system shown in FIG. 1.

Referring now to FIG. 1, a processing system 100 in accordance with an embodiment of the present disclosure is shown. The processing system 100 that is depicted includes a number of processors including a first processor 10A, a second processor 10B, a third processor 10C, and a fourth processor 10D. Each of the first processor 10A, the second processor 10B, the third processor 10C, and the fourth processor 10D may be designed and have components in conformity with one or more of the present embodiments, for example may be designed and have components in conformity with the expedited flush restore processor core 22 that is shown in FIG. 2 and that is configured to perform the expedited flush restoring process that is described and shown in FIG. 3. The processing system 100 that is depicted with multiple processors is illustrative. Other processing systems in accordance with other embodiments may include a single processor having symmetric multi-threading (SMT) cores. The first processor 10A includes a first processor core 11A, a second processor core 11B, and a local storage 12, which may be a cache level, or a level of internal system memory. The second processor 10B, the third processor 10C, and the fourth processor 10D may have similar internal components and/or the same design of internal components as the first processor 10A is shown as having. The first processor 10A, the second processor 10B, the third processor 10C, and the fourth processor 10D are coupled to a main system memory 14 and to a storage subsystem 16, which includes non-removable drives and optical drives, for reading a first portable computer-readable tangible storage device 17. The processing system 100 also includes input/output (I/O) interfaces and devices 18 such as mice and keyboards for receiving user input and graphical displays for displaying information. The various processors described may be microprocessors, integrated circuits, embedded systems, and/or the equivalent.

As will be discussed with reference to FIG. 6, the processing system 100 may also be implemented in one or more of the computers described in the computing environment 600.

While the system of FIG. 1 is used to provide an illustration of a system in which the processor architecture of the present embodiments is implemented, it is understood that the depicted system is not limiting and is intended to provide an example of a suitable computer system in which the techniques of the present embodiments are applied. It should be appreciated that FIG. 1 does not imply any limitations with regard to the environments in which different processor core embodiments may be implemented. Many modifications to the depicted environment may be made based on design and implementation requirements.

FIG. 2 shows a block diagram illustrating portions of an expedited flush restore processor core 200 in accordance with at least one embodiment and that may be implemented in one or more of the processors of the processing system 100 shown in FIG. 1. The expedited flush restore processor core 200 may include an instruction cache 201, a dispatch 202, a mapper 204, and multiple save-and-restore buffers 206a, 206b, 206c, 206d that are separated as slices 0, 1, 2, 3, respectively. The expedited flush restore processor core 200 may include additional components that are not shown in FIG. 2 such as an issue queue, execution slices, etc.

Computer readable program instructions may be loaded onto a computer, other programmable data processing apparatus, or other device to be carried out via the expedited flush processor core 200 and cause a series of operational steps to be performed on the computer, other programmable apparatus, or other device to produce a computer-implemented process. The instructions are executed on the computer, other programmable apparatus, or other device via the expedited flush restore processor core 200.

The instruction cache 201 may, e.g., in a temporary manner, store one or more instruction streams fetched from another cache or system memory and transfer the instruction stream(s) to the dispatch 202. The instruction cache 201 itself may include cache memory and in some instances an instruction buffer. The instruction cache 201 may feed into the dispatch 202. The dispatch 202 may include a routing network and may send a received instruction to a queue in preparation to be scheduled for issue and execution. The dispatch 202 in the depicted embodiment feeds directly into the mapper 204.

The mapper 204 manages register tags. e.g., slice target file (STF) tags, that act as pointers to data in an array in the processor. The mapper 204 is logically a table which maps logical registers, e.g., general-purpose registers ("GPRs"), to the instruction that produces the result and to a destination location for executing an instruction. The mapper 204 may use tags to perform this mapping. For example, the mapper may use an instruction tag ("ITAG") to refer to the instruction that produces a result. The mapper 204 may use an STF tag to refer to the destination location for an instruction. The destination location is the physical location where the data is written as part of execution of the instruction.

The mapper 204 may be a system logical mapper and may be partitioned by logical register type into a plurality of partitions. For example, the mapper may be partitioned into a general-purpose register ("GPR") partition, a floating-point register/lower vector scalar register ("V0") partition, and an upper vector scalar register ("V1") partition. As an example, a logical register mapper may have ninety-six registers, thirty-two GPR registers, thirty-two V0 registers, and thirty-two V1 registers. The most significant bit of the each of the mapper registers may be used to differentiate the various logical register assignments with registers 0-31 being GPR, 32-63 being V0, and 64-95 being the V1 registers.

As instructions are executed, the logical register mapper values may be copied to save and restore buffer locations in one or more save and restore buffers. This copying is indicated in FIG. 2, for example, with the copy arrow 216 that extends from the mapper 204 to the first save-and-restore buffer 206a and particularly to the entry latches 208a of the first save-and-restore buffer 206a. Copying may occur from the mapper 204 to the other save-and-restore buffers 206b, 206c, 206d as well and, particularly, to the other entry latches 208b. 208c, 208d of the other save-and-restore buffers 206b. 206c. 206d, respectively.

The save-and-restore buffer is a structure which saves prior mapper states for the purpose of being able to restore the state if one or more instructions need to be flushed. The save-and-restore buffer includes memory structure such as latches which store entries which hold information necessary to restore a particular mapper register to the mapper in response to a flush. The latches may include memory structure such as a type of pulse-sensitive memory cell circuit that has the ability to change state in response to a certain input pulse level. Latching is the process of temporarily storing a signal in order to maintain a specific level state and to record information. The save-and-restore buffer in the expedited flush restore processor core may have a number of entry latches that is greater than the number of staging latches in the expedited flush restore processor core which store recently dispatched instructions as described in the present disclosure, because the save-and-restore buffer saves a complete set of instruction information for a flush restore but the staging latches contain a partial set that may include information representing the most recently dispatched instructions. The save-and-restore buffer entry latches may, for example, store four threads worth of information, eight threads worth of information, one threads worth of information, etc. The save-and-restore buffer entry latches are also positioned in and/or near a beginning stage of a restore pipeline ("RP") 210a, 210b, 210c, 210d, whereas the staging latches are disposed in intermediate stages of the restore pipeline 210a, 210b, 210c, 210d. The entry latches of the save-and-restore buffer(s) also hold their states until their contents are flush restored or until the instructions corresponding to their contents are completed; the staging latches, however, may have their contents replaced with information corresponding to the next dispatch as part of cycling through newly-received information.

The instruction information may be retrieved from the save-and-restore buffer entry latches and sent to a particular restore pipeline 210a, 212a, 214a based on the type of instruction information. Instruction information from the first save-and-restore buffer 206a and headed for the general processor registers "GPR" may be restored through the restore pipe 210a. Instruction information of the first save-and-restore buffer 206a and headed for the floating-point register/lower vector scalar register ("V0") partition may be restored through the restore pipe 212a. Instruction information of the first save-and-restore buffer 206a and headed for the upper vector scalar register ("V1") partition may be restored through the restore pipe 214a. Similar instruction information-type routing may be performed in the other save-and-restore buffers 206b, 206c, 206d, as well. For example, restore pipes 210b, 210c, 210d of the other three save-and-restore buffers 206b, 206c, 206d may each be GPR restore pipes and be headed for GPR partitions in the mapper 204. Restore pipes 212b. 212c. 212d of the other three save-and-restore buffers 206b. 206c, 206d may each be V0 restore pipes and be headed for V0 partitions in the mapper 204. Restore pipes 214b, 214c, 214d of the other three save-and-restore buffers 206b, 206c. 206d may each be V1 restore pipes and be headed for V1 partitions in the mapper 204.

FIG. 2 shows that in addition to copying the instruction information in entry latches of the save-and-restore buffers, the instruction information is also copied into staging latches such as the first staging latches 22a, 22c, 22e and/or the second staging latches 22b, 22d, 22e. This additional copying to the first staging latches 22a is indicated with the staging arrow 218 that runs from the mapper 204 into the first staging latch 22a. These staging latches 22a, 22c, 22e, 22b, 22d, 22e may also include memory structure such as a type of pulse-sensitive memory cell circuit that has the ability to change state in response to a certain input pulse level. These staging latches may temporarily store a signal in order to maintain a specific level state and to record information. The first staging latches may be disposed within and/or adjacent the respective restore pipe, e.g., the first staging latch 22a may be disposed within and/or adjacent to the GPR restore pipe 210a of the first save-and-restore buffer 206a, the first staging latch 22c may be disposed within and/or adjacent to the V0 restore pipe 212a of the first save-and-restore buffer 206a, and the first staging latch 22e may be disposed within and/or adjacent to the V1 restore pipe 210c of the first save-and-restore buffer 206a. The first staging latches 22a, 22c, 22e may, respectively, have port connections to the various restore pipes, e.g., to the GPR restore pipe 210a, to the V0 restore pipe 212a, and to the V1 restore pipe 214a, respectively. The second staging latches 22b, 22d, 22f may be formed of a same type of memory structure which the first staging latches 22a. 22c, 22e have. In some embodiments the first and second staging latches 22a, 22c, 22e, 22b. 22d, 22f are disposed partially in the normal restore pipes, but with some additional information to allow for flush calculation.

The instruction information saved in the first and/or second staging latches may include a respective instruction tag as well as a logical register indicator. The logical register indicator indicates which part and/or address of the save-and-restore buffers stores the information for the respective instruction, e.g., which specific entry latch or latches of the save-and-restore buffers store the respective instruction information. The restore pipe 210a may include metal wiring 220 running between different logical sections of the expedited flush restore processor core 200. Although these staging latches are depicted in the various restore pipes of the first save-and-restore buffer 206a ("Slice 0"), additional similar staging latches may also be implemented in the restore pipes of the other save-and-restore buffers such as the second, third, and fourth save-and-restore buffers 206b, 206c, 206d.

A most recently dispatched instruction from the dispatch 202 may be stored in one of the first staging latches 22a, 22c, 22e. In response to another new instruction (e.g., a second instruction) being dispatched from the dispatch 202 and the previous first instruction still being in the first staging latch 22a, 22c, or 22e, the first instruction may be transferred from the first staging latch 22a, 22c, or 22e to the corresponding second staging latch 22b, 22d, or 22f, respectively, to make room within the first staging latch to hold the newer instruction (the second instruction). The 2nd staging latch would partially be stored in the normal restore flow latches, but with some additional information to allow for flush calculation. The latch transfer arrow 219 shown in FIG. 2 shows an example of such a cycling flow transfer between the first staging latch 22a and the second staging latch 22b. Thus, after this rolling transfer scenario is completed the first staging latch may hold the second instruction, i.e., a new first instruction or a most-recently dispatched instruction, and the second staging latch holds the original first instruction or a second-most recently dispatched instruction. In at least some embodiments, the expedited flush restore processor core 200 may include three pipes per slice (GPR/V0/V1) and multiple dispatch cycles, e.g., first and second dispatch cycles, may occur for each of the three pipes per slice. The rolling cycle occurs by pipe/register type, e.g., GPR/VR0/VR1.

In response to a further instruction, e.g., a third instruction, being dispatched from the dispatch 202, the original first instruction may be pushed out of or deleted from the second staging latch 22b, the second instruction may be transferred from the first staging latch 22a to the second staging latch 22b, and the third instruction may be stored in the first staging latch 22a as a further new first instruction.

Thus, the staging latches may capture the instruction information of recently dispatched instructions in a rolling cyclical manner, with information for a particular number of instructions being temporarily held according to the number of staging latches for a particular save-and-restore buffer slice.

The staging latches and their role in the expedited flush restore will be described in more detail in the expedited flush restore processor pipeline shown in FIG. 3.

Restore pipes 210a, 212a, 214a, 210b, 212b, 214b, 210c, 212c, 214c, 210d, 212d, 214d may be provided between the entry latches 208a, 208b, 208c, 208d of the save-and-restore buffers 206a, 206b, 206c, 206d and the logical register mapper partitions of the mapper 204 in order for a flush restore operation to be carried out on a partition-type basis. Restore pipes may include one or more wired connections 220 in the architecture of a processor unit linking the save-and-restore buffers with the registers of the logical register mapper locations. As an example, each partition of the mapper, including the thirty-two GPR registers, thirty-two V0 registers, and thirty-two V1 registers, may have dedicated restore pipelines from the SRB such that each mapper register receives instruction information of a particular type by way of restore pipelines having the same assigned logical register type. Any mapper content can write to any of the SRB entry latches. The save-and-restore buffer in at least some embodiments does not tie to register type until the retrieved instruction information enters the restore pipeline on the way back to the mapper 204. The copying of mapper values to SRB locations occurs on a per slice basis as instructions are dispatched. The save-and-restore buffers in at least some embodiments contain one or more of the mapper register value, the INSTRUCTION TAG of the instruction, a register file tag (e.g., an STF tag) associated with the value and which points to the register file location, and a flush-recovery field. All or some of this information may be referred to as entry data of the entry latches of the save-and-restore buffers.

For regular execution of an instruction, the mapper 204 will transfer instructions to other components of the expedited flush restore processor core 200 such as an issue queue and execution units. This regular transfer is indicated with the exit arrow 230 shown in FIG. 2. The expedited flush restore processor core 200 may be part of a single integrated circuit processor such as a superscalar processor and may include various execution units, registers, buffers, memories, and other functional units such as an instruction decode unit, an instruction issue unit, a load/store unit, an operand address generation unit, a fixed point unit, etc. The expedited flush restore processor core 200 in at least one embodiment is capable of issuing and executing instructions out-of-order.

After a flush-recovery event, such as a system exception, the expedited flush restore processor core 200 will set a restore required bit as active. The flush recovery field of the SRBs associated with the mapper value at a point prior to the flush-recovery event will be set to indicate the need to recover these values to the mapper. The SRB values will then be restored to the mapper registers of the mapper 204 using the restore pipes 210. As the restore pipes 210 and the mapper registers are each partitioned by logical type, the expedited flush restore processor core 200 may recover mapper registers in parallel allowing multiple registers to be recovered each clock cycle. In an embodiment, two each of GPR, V0, and V1 register values may be recovered from each of four execution slices stored in the SRB locations per clock cycle. The recovered values may then be mapped to the mapper 204 by way of the logical register-specific restore pipelines 210. The ninety-six register values of the mapper 204 may recover two per cycle from each of the four slices and may thus be completely recovered in only four cycles. In at least some embodiments, the restore pipes 210 are partitioned by logical portion register to each of the corresponding thirty-two mapper registers of the same logical register type, rather than being wired directly to each of the entire ninety-six registers of the mapper 204. This portioning and/or partitioning of the restore pipes 210 and the mapper 204 enable rapid parallel recovery of the mapper 204 from the save-and-restore buffers 206a, 206b, 206c, 206d.

Figure 3:
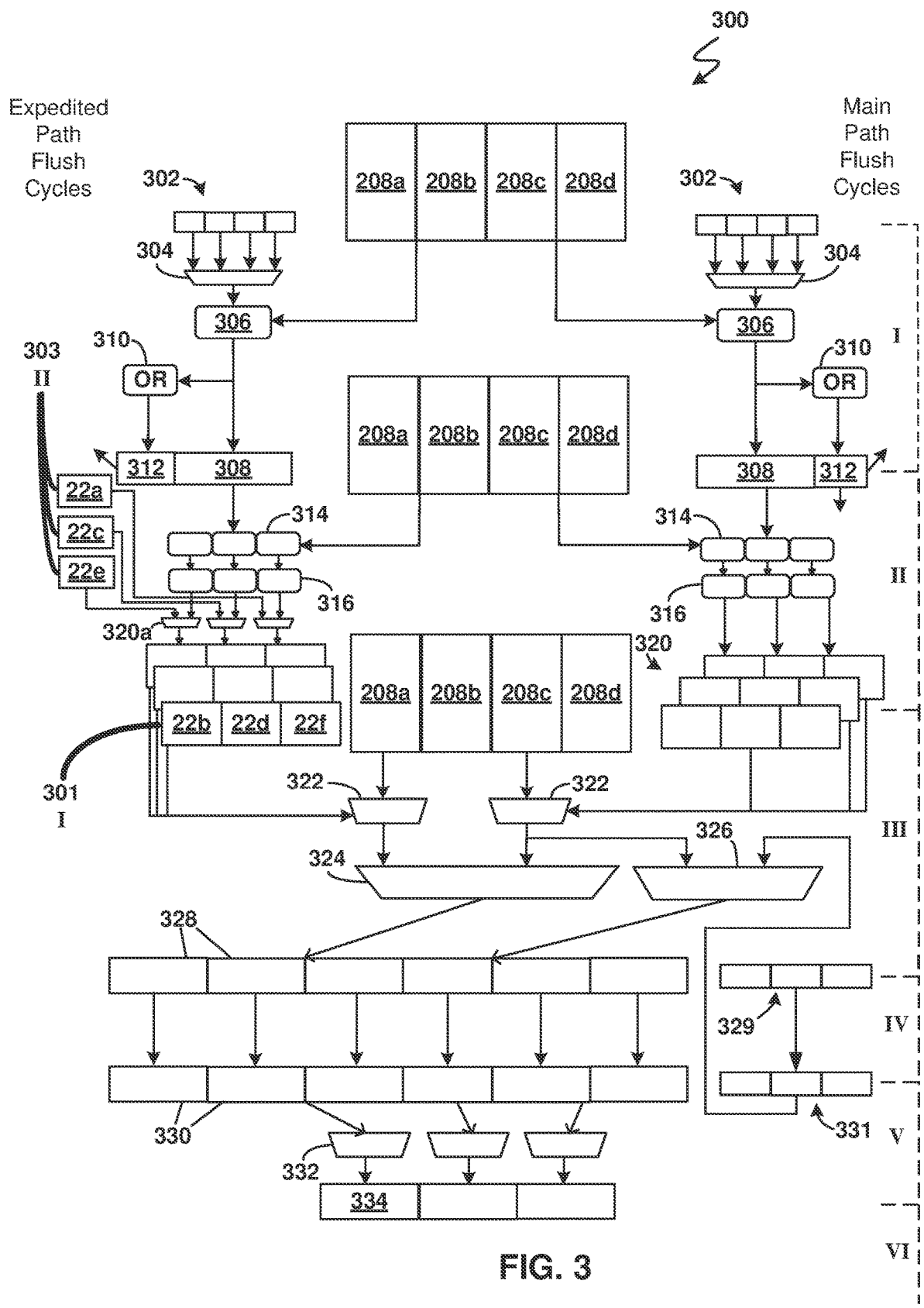
FIG. 3 is a processor pipeline diagram illustrating an expedited flush restore process in accordance with at least one embodiment and which may be carried out by the expedited flush restore processor core depicted in FIG. 2.

FIG. 3 is a processor pipeline diagram 300 illustrating an expedited flush restore process in accordance with at least one embodiment and which may be carried out by the expedited flush restore processor core 200 depicted in FIG. 2. The processor pipeline diagram 300 shows a repeat of some structure over some of the cycles but not for other cycles, in order to emphasize elements of particular importance for a particular cycle. Thus, for example, the SRB entry latches are depicted in the main path FL+1, FL+2, and FL+3 cycles but are not depicted in the main path FL+4, FL+5, and FL+6 cycles.

The left side of the processor pipeline diagram 300 shown in FIG. 3 illustrates an expedited flush restore and cycle modifications corresponding to same, while the right side of the processor pipeline diagram 300 shown in FIG. 3 illustrates a main path flush restore and processor cycles corresponding to same. The expedited flush restore processor core 200 may perform both the expedited flush restore and the main path flush restore that are shown in FIG. 3 and described herein.

The expedited flush restore is performed using the staging latches that were described above with respect to FIG. 2 for storing information representing recently dispatched instructions. The expedited flush takes advantage of the concept that the most recently dispatched instructions are most likely to get flushed. Therefore, the placing of the recently dispatched instructions in the staging latches of the save-and-restore buffers that are disposed further along the restore pipe stages of the save-and-restore buffers constitutes a prioritization of these most recently dispatched instructions. The instruction information from these staging latches are restored first, without waiting for instruction tag comparison that is traditionally performed with the entry latches of the save-and-restore buffers. The instruction information from the staging latches take prioritization over the usual entry latches of the save-and-restore buffers, because the instruction information from the staging latches may be transmitted to the mapper 204 and restored before the instruction information from the mapper 204 can travel far enough in the restore pipes 210 to be in a position to be transmitted to the mapper 204. With two staging latches in place, this expedited process will speed up the restore of the mapper 204 at least two cycles from the flush.

The top of the processor pipeline diagram 300 indicates the start of the flush process and may be referred to as the flush plus zero ("Flush+0") cycle. In this portion of the pipeline, the flush command is broadcast and received at the various design elements such as the save-and-restore buffers 206a, 206b, 206c, 206d and the mapper 204. The design elements at this point have received but not had time to respond to the flush command. This reception of the flush command causes the design elements to begin to perform the additional actions associated with a flush and flush restore. The reception of the flush command may trigger notifications to the first staging latches 22a, 22c, 22e, to the second staging latches 22b, 22d, 22f, and to the entry latches 208a, 208b 208c, 208d of the save-and-restore buffers 206a, 206b, 206c, 206d. With the expedited flush restore processor core 200, the notifications to the entry latches may cause the save-and-restore buffer entries corresponding to the instruction information saved in the first and second staging latches to be marked as having the restore done so that the main restore path skips over these entries. Marking these entries within the FL+1 cycle as already being restored will help avoid Lreg information from being read for these entries and will help avoid the remaining contents of their stored information from being read, e.g., in subsequent cycles. The reception of a flush command by the save-and-restore buffer also forwards instruction tags of the command to the first multiplexer 304 to initiate various processes such as a flush restore. The first multiplexer 304 performs a function of selecting the proper flush thread to compare against for the flush compare in compare logic box 306.

The left portion of FIG. 3 shows that for the expedited path flush the entry from the second staging latch 22b is dispatched at the time equivalent to the main path cycle III. Whereas the main path flush cycle requires comparing instruction tag information to the entry latches of the save-and-restore buffers, the expedited path does not have to wait for the instruction tag information comparison to the SRB entry latches and can send the staging latch-stored information promptly in the FL+1 cycle. A first dispatch cycle 301 is shown in FIG. 3 to indicate the dispatch of the information stored in the second staging latch 22b. This staging latch 22b may be along a stage of the restore pipeline 210a between the SRB entry latches 208a and the mapper 204. The staging latch may be used to store a recently dispatched instruction because this staging latch is, according to procedures of the main path, empty and/or unused at these initial stages of the flush restore. The second staging latch 22b may typically be in the position of an output of a multiplexer, e.g., the staging latch multiplexer 320a. In this Flush+1 cycle, the information saved in the second staging latch 22b may be compared to thread information of the flush mask in order to confirm a thread match. If a thread match is confirmed, then a flush restore with the information saved in the second staging latch 22b may proceed. If a thread match is not confirmed, then the information in this particular staging latch 22b is not relevant to the current flush restore and may temporarily remain dormant in the staging latch 22b.

This information from the second staging latch 22b, 22d, 22f may in the first processor cycle be provided from the first staging latch for mapper restoration. In at least some embodiments with the expedited process a two cycle advantage is achieved. Whereas the main path flush cycle does not have instruction information provision until the third main path cycle (III), the expedited path has instruction information provision in the first stage/cycle after reception of the flush command. On the expedited path cycle, instruction information from the second staging latch 22b, particularly lreg information of the relevant instruction, may be provided/read in the first processor cycle and used to lookup the instruction restoration information from the correct address in the entry latches of the save-and-restore buffers.

The information in the second staging latch 22b in at least some embodiments was previously in the first staging latch 22a and passed to the second staging latch 22b because new instructions arrived. Thus, the information in the second staging latch 22b may represent second-most-recently dispatched instructions and the information in the first staging latch 22a may represent most-recently dispatched instructions in some embodiments.

Also in the first processor cycle, the instruction information from the first staging latch 22a may be multiplexed via the staging latch multiplexer 320a into the restore pipe. At this timepoint before any information has been forwarded from the entry latches of the mapper 204, the staging latch multiplexer 320a will by default select for forwarding this information received from the first staging latch 22a, because no other information is present at this staging latch multiplexer 320a to compete with the information received from the first staging latch 22a. A staging latch multiplexer 320a is labeled in FIG. 3. Each of the first staging latches 22a, 22c, 22e may be input into a separate staging latch multiplexer which selects between this information from the respective first staging latch and information flowing along the main restore pipeline.

A second dispatch cycle 303 is shown in FIG. 3 to indicate that the dispatch of the information stored in the first staging latch 22a occurs in a time interval equivalent to the main path cycle II. In the second processor cycle, for the expedited path flush the instruction information retrieved from the entry latches by using the address from the second staging latch 22b may be driven to the mapper 204 also while instruction information taken from the first staging latch 22a is read as that first staging latch instruction information now sits in the second staging latch 22b or an equivalent position within the restore pipeline.

In the third processor cycle, for the expedited path flush the instruction information retrieved from the entry latches by using the address originally from the first staging latch 22a (which in some embodiments was passed from the first staging latch 22a to the second staging latch 22b) may be driven to the mapper 204. Therefore, already by the third processor cycle in the expedited flush path the first instruction information and the second instruction information are driven to the mapper 204. By the third processor cycle in the main path flush, however, the information from an entry latch of the save-restore-buffer is merely being read. This performance acceleration for the expedited flush path shows how using the staging latches may illustrate a cycle advantage, e.g., a two-cycle advantage, for achieving mapper restoration. When the main path flush occurs in conjunction with the expedited flush, the main path flush may provide information from a third most recently dispatched instruction or other earlier instruction to continue the expedited flush restore after receiving the jump start from the one or more staging latches. The main path flush may be designed to skip over entries corresponding to the first and second most recently dispatched instructions and thereby feed other information for the middle or back parts of a flush restore. For this earlier instruction, e.g., a third instruction, the entry latch may be read in the third cycle after flush command receipt. That retrieved/read entry may be driven to the mapper in the fourth cycle after flush command receipt.

In the Flush+1 cycle, tags 302 are flush tags or completion tags and are compared against tags in entries of the entry latches 208a, 208b, 208c, 208d. The flush/completion tags for each thread go to all the entries. Within the entries, each of the entries muxes the proper thread flush/completion itag and does the compare. A first multiplexer 304 may select between the flush/completion between the four threads, e.g., one entry could be flushing the thread 0 and another entry completing the thread 1. By performing this selection, the first multiplexer 304 forwards flush-related instructions further in the flush restore pipeline. A first multiplexer 304 muxes the proper thread flush/completion itag within each entry, so each entry has the mux 304 (although a single first multiplexer 304 is shown in FIG. 3). The compare logic box 306 is also provided for each entry so that there would be more than one present. The components namely the tags 302, the restore vectors 308, and the hold dispatch logic 312, however, are either sent to our pulled from all of the entries of the particular slice. A number of the instruction tags may correlate to the number of threads of entry latches of the save-and-restore buffer, so the first multiplexer 304 selects the appropriate flush/completion tag to match against the information held in the entry. The received information indicates what the save-and-restore buffer entry is holding. The first multiplexer 304 selects from potential flush/completion tags 302 to provide to the compare logic box 306. The compare logic box 306 will perform a compare of the flush tag against the entry tag (evictor) and the prior tag (evictee). If the evictor is flushed and the evictee is not flushed then the entry must be restored to the mapper. The comparison helps make retrieval decisions based on which instruction is being flushed. If the instruction is younger than the flushing instruction, then the younger instruction will be involved in the flushing and, therefore, the flush restore. All latch entries of the save-and-restore buffer are, in the traditional path, read in the flush+1 cycle to check for relevancy to the flush command.

When an instruction is completed, the processor notifies the save-and-restore buffers so that the entry for the respective instruction may be retired from the save-and-restore buffers. This retiring may be performed by removing the respective entry from the save-and-restore buffers. If one of the instruction tags 302 indicates that an instruction is completed, the two flush cycle paths shown in FIG. 3 do not need to be undertaken for that instruction tag. If such instruction tag indicates completion of an instruction, then the expedited flush restore processor core 200 may also compare to the entries of the first staging latches 22a, 22c, 22e and/or to the entries of the second staging latches 22b, 22d, 22f and clear the corresponding information from the staging latches if the entries match. This clearing of the staging latches would prevent this information from a completed instruction being injected into the flush restore process, because information from a successfully completed instruction is not needed for a flush restore.

When a flush command is received, the flush command provides information about the instructions involved in the flush. The flush command information may in the compare logic box 306 be compared to the entries of the entry latches 208a, 208b, 208c, 208d of the save-and-restore buffers. The compare logic box 306 receives inputs from the entry latches 208a, 208b, 208c, 208d and also receives outputs from the first multiplexer 304 in order to compare the information from the two different input streams to each other. Flush tags of the instruction tags in 302 indicate what tag is flushed and if the flush tag is valid. For the flush compares of the staging latches, the compare is performed further downstream in the restore pipeline as compared to when the compare is performed for the entry latches of the save-and-restore buffer. If the instruction information that was evicted by the respective instruction did not flush and the respective instruction did flush, then a flush restore process needs to be performed. Therefore, in the FL+1 cycle the received new instruction tags are compared against all entries of the entry latches 208a, 208b, 208c, 208d. In some embodiments, the entry latches 208a may encompass registers 0-31 and may refer to the GPR, the entry latches 208b may encompass registers 32-63 and may refer to the V0 registers, the entry latches 208c may encompass registers 64-95 and may refer to the V1 registers, and the entry latches 208d may encompass registers 96:127. The number of instruction tags 302 gathered may correspond to the number of entry latch partitions, e.g., four instruction tags for four entry latch partitions 208a, 208b, 208c, 208d for the four save-and-restore buffers 206a, 206b, 206c. 206d, respectively.

If, based on the comparison in the compare logic box 306, a need for a flush restore is identified, the compare logic box 306 forwards the flush restore information to both the OR logic 310 and to the restore vectors 308. The OR logic 310 performs an ORing of all instructions involved in the flush restore and then sends the ORed group of instructions to the hold dispatch logic 312 in order to set the latch of the hold dispatch logic 312. The hold dispatch logic 312 prevents any new dispatches on the related thread until the entries in the restore vectors 308 have run dry and have completed. The arrows extending from the hold dispatch logic 312 without a receiving box represent the transmission of hold instructions being sent to the dispatch 202 and/or to other components of the processor to perform the holding/prevention of dispatches for the particular thread. The restore vectors 308 may include latches with bits that correspond to the entry latches 208a, 208b, 208c, 208d of the save-and-restore buffers 206a, 206b, 206c, 206d. When an instruction is involved in the flush restore, the bit of the latch of the restore vectors that corresponds to the entry for this instruction in the entry latches is set.

The OR logic 310, the hold dispatch logic 312, and the restore vectors 308 together form a loop that continues until the flush restore is completed. The relevant entries involved in the flush will remain in the restore vectors 308 until these instructions are processed. The instructions will be processed one at a time per restore pipe. This loop helps avoid the scenario of the expedited flush restore processor core 200 trying to do a dispatch and a flush restore on the same mapper entry at the same time. Such scenario would likely trigger a processor error, and the loop helps avoid this error.

In the main stage cycle II, the hold dispatch logic 312 includes a bit that is set by thread to send to the dispatch logic in order to prevent new dispatches from being dispatched to the restoring thread. This setting of the bit is accomplished by ORing with the OR logic 310 the entries for request restore for the respective thread. Once all entries are done restoring, the bits setting the restore vectors 308 are cleared out which also clears out the path through the OR to the hold dispatch logic 312. This loop is similar or equivalent to the loop described above for the expedited path flush cycle shown to the left in FIG. 3.

In the main path cycle stage II, the restore requests are filtered out of the restore vectors 308 by logical register to restore. The filtered requests are passed to the find logic 314 where entries are selected for each of the register types. The find logic 314 may in some embodiments include multiple partitions corresponding to the multiple partitions of the save-and-restore buffers, e.g., the find logic 314 may include a first find logic for the general-purpose register GPR, a second find logic for the floating-point register/lower vector scalar register V0, and a third find logic for the upper vector scalar register V1.

Once the find logic 314 has selected an entry to restore from each partition, the entry number, e.g., the number representing the bit or entry of the restore vector that is selected, is encoded with encode logic 316 to reduce the number of bits being passed down through the restore logic.

The information for the relevant entries is sent as the output 320 from the second cycle stage. This output 320 is provided as input to the third cycle stage.

These cycle stages I and II in the main path flush cycles include functions and elements that are also performed in the cycle stages I and II in the expedited path flush cycles. However, the main path flush cycles do not include the expedited activity with the first and second staging latches. The expedited path flush cycle in stages I and II includes the dispatch hold loop and instruction tag compare to the entry latches, but these actions will be used for any later instructions that need to be flushed and not for the one or two most recently dispatched instructions.

In the Flush+3 cycle in the main path, instruction entries are read from the entry latches 208a, 208b, 208c, 208d to obtain the information therefrom in order to send that information to the mapper 204 for restoring the mapper 204. At that position, the lreg that was retrieved in the Flush+2 stage and is part of the output 320 for each entry is used to find the correct address within the entry latches 208a, 208b, 208c, 208d. Then the respective address is read to obtain the correct instruction information. The read information is fed to the information multiplexer 322 which feeds to the stage three multiplexer 324 and to the optimization multiplexer 326. The information multiplexer 322 selects the appropriate SRB interface layer 328 for a particular instruction information type. The optimization multiplexer 326 receives input from second optimization latches 331 which received input from first optimization latches 329. The optimization latches 329, 331 help customize according to port availability for simultaneous multithreading which allows multiple instruction streams (threads) to run concurrently on the same physical processor.

For the expedited path, a retrieval/reading already occurred at the corresponding pipeline position in the Flush+1 cycle and again at the corresponding pipeline position in the Flush+2 cycle. The retrieval in the Flush+1 cycle was for the entry from the second staging latch holding the information of the second most recently dispatched instruction. The retrieval in the Flush+2 cycle was for the entry from the first staging latch holding the information of the most recently dispatched instruction.

In the Flush+4 cycle in the main path, the retrieved/read instruction information is driven from the stage three multiplexer 324 and the optimization multiplexer 326 to the SRB interface layer 328 to drive the information to the mapper 204. The SRB interface layer 328 may drive this information via a transmission to the mapper interface layer 330. This transmission may occur through the pipe wiring 220 shown in FIG. 2. The mapper interface layer 330 receives the transmission. This pipe wiring 220 may in some instances be referred to as a recovery cycle pipeline. The SRB interface layer 328 and the mapper interface layer 330 may include latches specific to the restore pipe partitions.

For the expedited path, this driving for the read/retrieved information representing the second most recently dispatched instruction already occurred at this corresponding pipeline position in the Flush+2 cycle. This driving for the read/retrieved information representing the most recently dispatched instruction already occurred at this corresponding pipeline position in the Flush+3 cycle.

In the Flush+5 cycle in the main path, the mapper interface layer 330 feeds the received instruction information to mapper multiplexers 332 for selection into the appropriate mapper partition 334. Upon being received, the received/retrieved instruction information is stored in the appropriate mapper partition 334.

For the expedited path, this feeding to the mapper multiplexes 332 and selection into and storage at the appropriate mapper partition already occurred for the read/retrieved information representing the second most recently dispatched instruction at the corresponding pipeline positions in the Flush+3 cycle. This feeding, selection, and storage already occurred for the read/retrieved information representing the most recently dispatched instruction at these corresponding pipeline positions in the Flush+4 cycle.

In the Flush+6 cycle, the read/retrieved information saved in the mapper 204 is now readable from the mapper 204. The mapper restore may be complete unless additional instructions are also being restored for this particular flush. The above steps may be repeated for each additional instruction involved in this particular flush operation.

For the expedited path, the availability for reading from the mapper 204 already occurred for the read/retrieved information representing the second most recently dispatched instruction in the Flush+4 cycle. This availability for reading from the mapper 204 already occurred for the read/retrieved information representing the most recently dispatched instruction in the Flush+5 cycle.

On a write-back, a detection is made whether the write-back is occurring to the same thread. If the write-back is occurring to the same thread, the write-back instruction tag is compared with the instruction tag of the instructions in the expedited restore staging latches. The read-bit, e.g., the W-bit, of the mapper 204 is set to equal one if this comparison indicates a match. A write-back affects data held in the save-and-restore buffer that may be restored to the mapper. The write-back function is for the written bit which indicates that the register has been written. This written bit may be read to learn if the data is ready. This written bit is cleared from the mapper 204 in response to receiving a new instruction from dispatch 202 that writes to the register of the mapper 204.

Upon completion of the flush restore, the mapper 204 may release the dispatch holds and new instructions may be written into the mapper 204.

It may be appreciated that FIGS. 2 and 3 provide only illustrations of some embodiments and do not imply any limitations with regard to how different embodiments may be implemented. Many modifications to the depicted embodiment(s), e.g., to a depicted sequence of steps or arrangement of processor components, may be made based on design and implementation requirements.

Table 1 below summarizes the advantages of the expedited path compared to the main path for restoring the mapper with a first staging latch. Table 2 below summarizes the advantages of the expedited path compared to the main path for restoring the mapper with two staging latches in operation.

TABLE 1

| Cycle: | FL + 0 | FL + 1 | FL + 2 | FL + 3 | FL + 4 |
|---|---|---|---|---|---|
| Main Path | Flush Command received | Itag compare | Find first | Ready Entry | Drive to Mapper |
| Expedited Path | Flush Command received | Read entry | Drive to Mapper | | |

TABLE 2

| Cycle | FL + 0 | FL + 1 | FL + 2 | FL + 3 | FL + 4 | FL + 5 |
|---|---|---|---|---|---|---|
| 2nd Staging Latch | Flush Command received | Read entry (1) | Drive to Mapper | | | |
| 1st Staging Latch | Flush Command received | Push to Restore Pipe | Read entry (2) | Drive to Mapper | | |
| Main Path First Select | Flush Command received | Itag Compare | Find first | Read SRB entry | Drive to Mapper | |
| Main Path 2nd Select | Flush Command received | Itag Compare | Entry Not Selected and Sits in Restore Vector | Find first | Read SRB entry | Drive to Mapper |

Tests performed with the expedited flush restore processor core 200 showed improvement in processing speeds.

Figure 4:
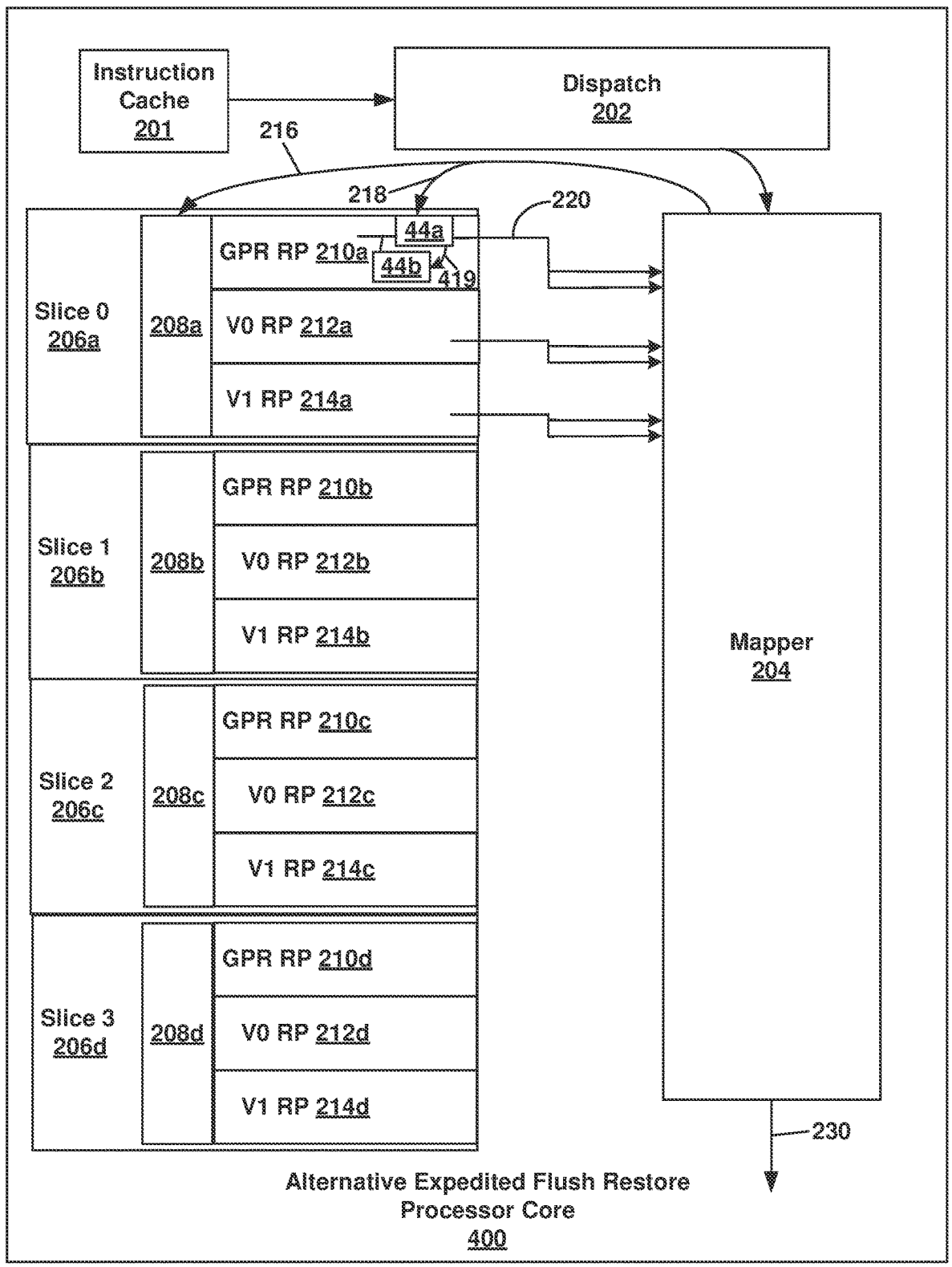
FIG. 4 is a block diagram illustrating portions of an alternative expedited flush restore processor core in accordance with at least one embodiment and that may be implemented in one or more of the processors of the processing system shown in FIG. 1.
Figure 5:
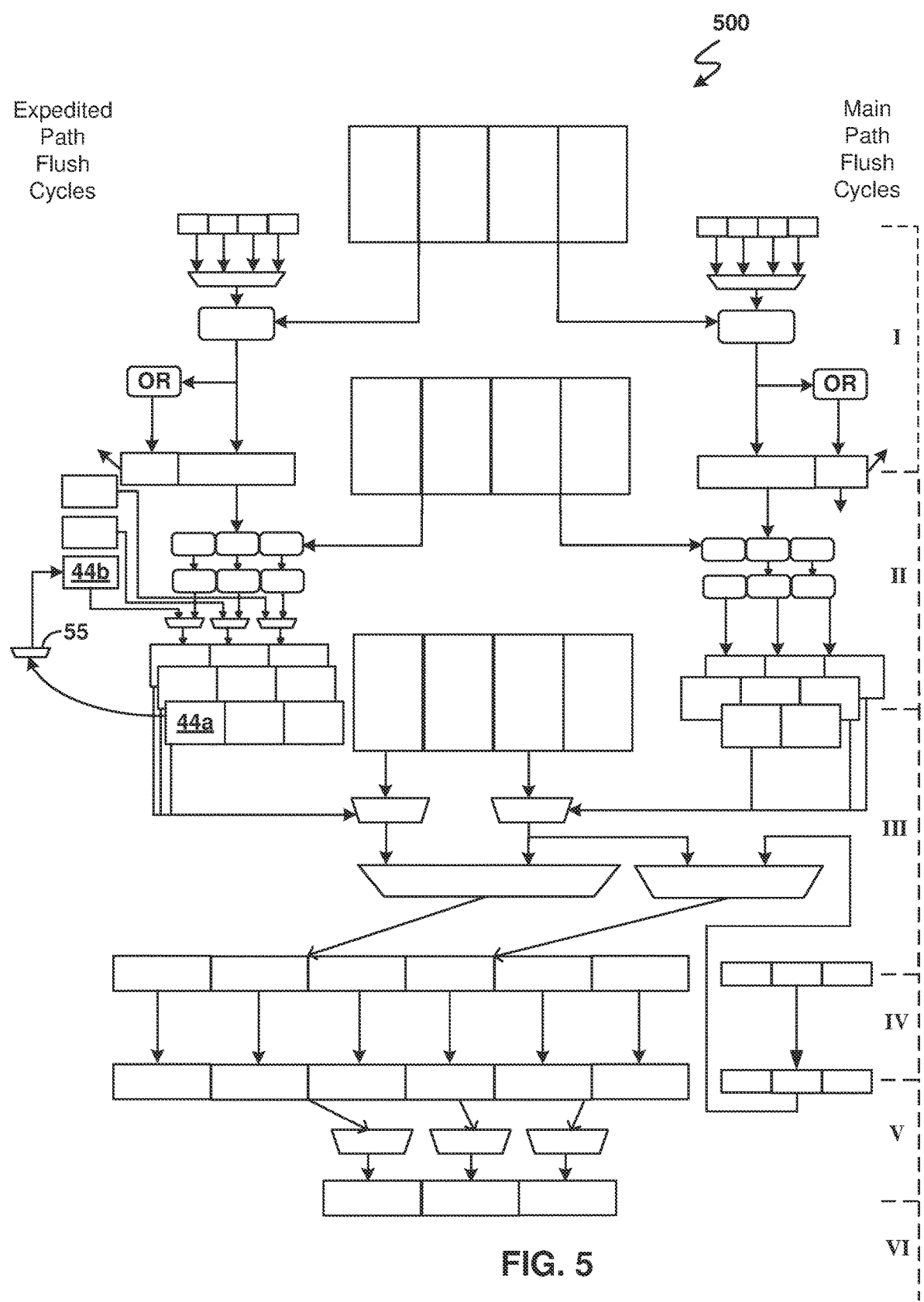
FIG. 5 is a processor pipeline diagram illustrating an alternative expedited flush restore process in accordance with at least one embodiment and which may be carried out by the alternative expedited flush restore processor core depicted in FIG. 4.

FIG. 4 is a block diagram illustrating portions of an alternative expedited flush restore processor core 400 which includes much of the same components, structure, and arrangement as the expedited flush restore processor core 200 shown in FIG. 2 has but with a reversed order of the first and second staging latches. FIG. 5 shows an alternative processor pipeline diagram 500 in accordance with at least one embodiment and which may be carried out by the alternative expedited flush restore processor core 400 depicted in FIG. 4. FIGS. 4 and 5 illustrate that for this alternative embodiment the positions of the first and second staging latches are switched, so that the alternative first staging latch 44a is disposed downstream of the alternative second staging latch 44b in the mapper restore direction of the restore pipe. This alternative may include additional first and second staging latches as are implemented for the FIGS. 2 and 3 embodiment, but for simplicity the alternative first and second staging latches 44a, 44b alone are labeled in FIGS. 4 and 5.

FIG. 4 shows that with this alternative arrangement the cycling flow transfer between the staging latches occurs in an upstream direction against the mapper restore direction of the restore pipe. The cycling flow transfer refers to the passing of instruction information between latches as new instructions are dispatched whose information is to be saved in the save-and-restore buffer and in the staging latches. As was explained above, a first instruction may initially site in a first one of the staging latches and then be pushed into another one of the staging latches when a new instruction comes in. Specifically, the alternative latch transfer arrow 419 shown in FIG. 4 shows an example of the alternative cycling flow transfer between the alternative first staging latch 44a and the alternative second staging latch 44b. In contrast, the latch transfer arrow 219 shown in FIG. 2 illustrates the cycling flow transfer between the first staging latch 22a and the second staging latch 22b occurring in a downstream direction with respect to the mapper restore direction of the restore pipe.

This alternative embodiment of FIGS. 4 and 5 achieves the advantage that in an embodiment with two staging latches per instruction type per slice, the most-recently dispatched instruction receives the advanced position (downstream in the mapper restore direction) of the staging latches. In the embodiment shown in FIGS. 2 and 3, the second most-recently dispatched instruction held the advanced position (downstream in the mapper restore direction) of the staging latches. Thus, the alternative embodiment of FIGS. 4 and 5 emphasizes the concept of achieving quicker restore by assuming a most recently dispatched instruction is most likely to be involved in the mapper restore. As is shown in FIG. 5 the alternative embodiment may include a cycling multiplexer 55 in the flow path for the cycling transfer between the alternative first staging latch 44a and the alternative second staging latch 44b. The cycling multiplexer 55 may select a correct second staging latch for a passed-back instruction information that was ejected from the first staging latch 44a due to the arrival of a new instruction. The embodiment shown in FIGS. 2 and 3 may be advantageous due to not needing such additional cycling multiplexer added to the usual main flow path components.

For this alternative embodiment, the most recently dispatched instruction will be driven to the mapper before the second most recently dispatched instruction. In the FIGS. 2 and 3 embodiment as explained previously, the second most recently dispatched instruction was driven to the mapper before the most recently dispatched instruction. The remaining components of the expedited path flush cycles and the main path flush cycles for the alternative embodiment shown in FIGS. 4 and 5 largely work the same as was described for these components and cycles with respect to the FIGS. 2 and 3 embodiment.

It may be appreciated that FIGS. 4 and 5 provide only illustrations of some embodiments and do not imply any limitations with regard to how different embodiments may be implemented. Many modifications to the depicted embodiment(s), e.g., to a depicted sequence of steps or arrangement of processor components, may be made based on design and implementation requirements.

Figure 6:
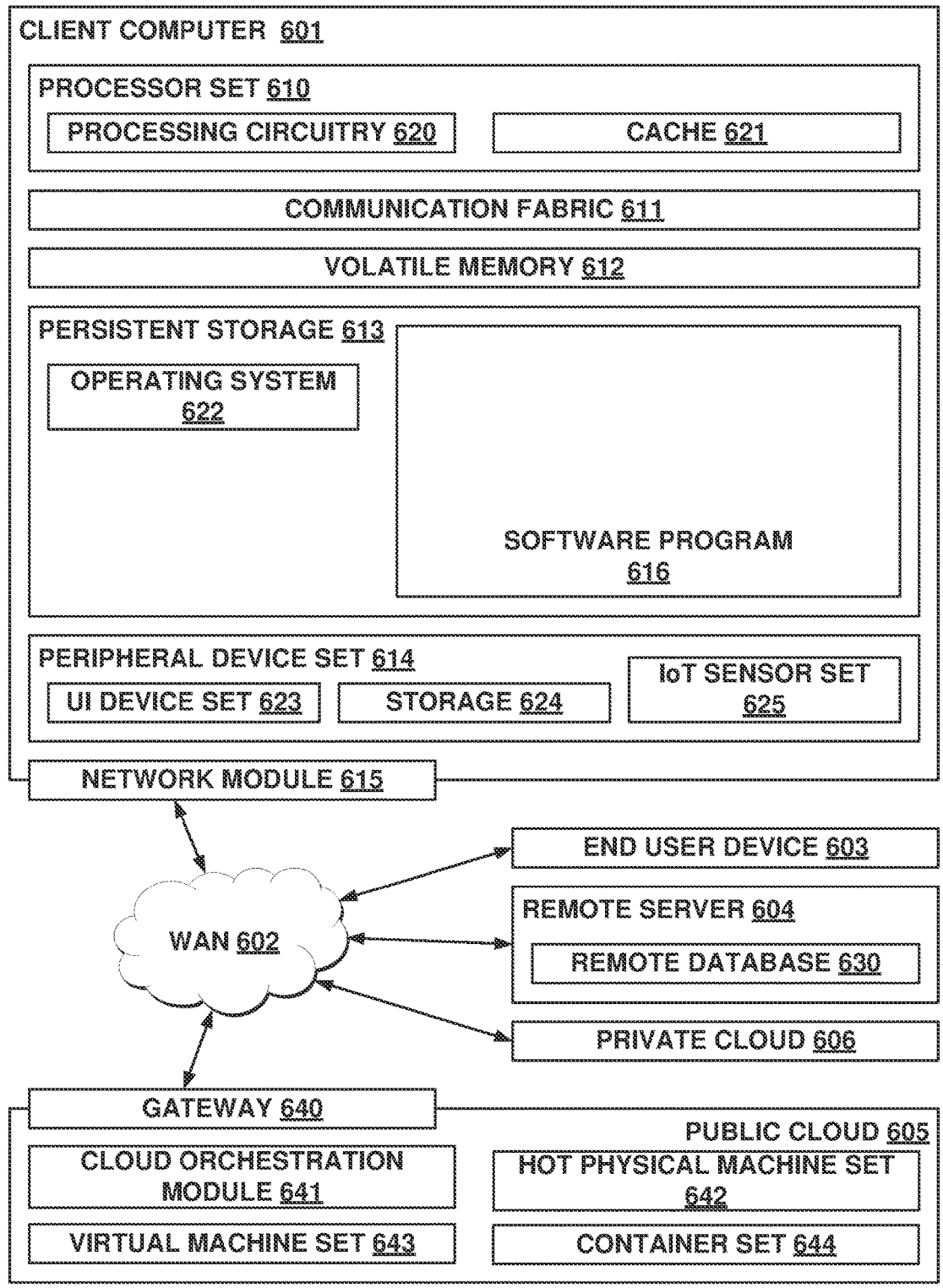
FIG. 6 is a block diagram illustrating a computer environment with multiple computer systems in which the expedited flush restore processor cores shown in FIGS. 2 and/or 4 and the processor pipeline diagram of FIGS. 3 and/or 5 may be implemented.

FIG. 6 is a block diagram of internal and external components of a computer system in which one or more of the processors as described herein may be implemented. Computing environment 600 shows an example of one or more computers with processors that perform the expedited flush restore. Computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and software program 616, peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644. The various computers shown may each include one or both of the expedited flush restore processor core 200 and the alternative expedited flush restore processor core 400 as described above.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. The various computers may perform methods distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud.

PROCESSOR SET 610 includes one, or more, computer processors of any type now known or to be developed in the future and which are configured to perform the expedited flush restore process described in this disclosure. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing. The processor set 610 may include one or more expedited flush restore processor cores 200 and the alternative expedited flush restore processor cores 400 as described above.

Computer readable program instructions are typically loaded onto computer 601 to cause a series of operational steps to be performed by processor set 610 of computer 601. These computer readable program instructions are stored in various types of computer readable storage media, such as cache 621 and the other storage media discussed below. The program instructions, and associated data, are accessed by processor set 610 to control and direct performance of the inventive methods.

COMMUNICATION FABRIC 611 is the signal conduction path that allows some components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments. UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector. The various sensors and/or UI devices may separately each include a package with one or more of the enhanced processors as described herein.

NETWORK MODULE 615 is the collection of computer software, hardware, and firmware that allows computer 401 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601) and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on. Each EUD 603 may respectively include a package with the enhanced processor as described herein.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604. The remote server 604 may include a package with one or more of the enhanced processors as described herein.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. Each of these physical computers may include a respective package with one or more of the enhanced processors as described herein.

The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

In computing environment 600, computer 601 is shown as being connected to the internet (see WAN 602). However, in many embodiments the computer 601 will be isolated from communicating over communications network and not connected to the internet, running as a standalone computer. In these embodiments, network module 615 of computer 601 may not be necessary or even desirable in order to ensure isolation and to prevent external communications coming into computer 601. The standalone computer embodiments are potentially advantageous, at least in some applications of the present invention, because they are typically more secure. In other embodiments, computer 601 is connected to a secure WAN or a secure LAN instead of WAN 602 and/or the internet. In these network connected (that is, not stand-alone) embodiments, the system designer may want to take appropriate security measures, now known or developed in the future, to reduce the risk that incoming network communications do not cause a security breach.

One some or all of the computer 601, computer components of the wide area network 602, the end user device 603, the remote server 604, computers of the public cloud 605, and computers of the private cloud 606 may include one or more processors that perform the expedited flush restore process as described herein.

The flowchart and block diagrams in the Figures illustrate the architecture, functionality, and operation of possible implementations of systems and methods according to various embodiments of the present invention. In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for restoring a mapper of a processor core, the method comprising:
    saving first information in a staging latch, the first information representing a newly dispatched first instruction of the processor core;
    saving the first information in an entry latch of a save-and-restore buffer of the processor core; and
    in response to reception of a flush command of the processor core, beginning the restoration of the mapper with the first information from the staging latch without waiting for a comparison of a flush tag of the flush command with the entry latch of the save-and-restore buffer.

2. The method of claim 1, further comprising:
    in further response to the reception of the flush command, marking the first information in the entry latch of the save-and-restore buffer as restore done.

3. The method of claim 1, further comprising:
    in further response to the reception of the flush command, processing remaining instruction information from the save-and-restore buffer for transmission to the mapper.

4. The method of claim 1, further comprising:
    in response to dispatch of a second instruction after the dispatch of the first instruction:
        transferring the first information from the staging latch into another staging latch,
        saving second information representing the second instruction in the staging latch, and
        saving the second information in another entry latch of the save-and-restore buffer; and
    in further response to the reception of the flush command of the processor core, proceeding with the restoration of the mapper also with the second information from the staging latch without waiting for a comparison of the flush tag of the flush command with the other entry latch of the save-and-restore buffer.

5. The method of claim 4, wherein in a first processor cycle following the reception of the flush command, a first logical register from the first information in the staging latch is used to read entry data from the entry latch of the save-and-restore buffer.

6. The method of claim 5, wherein the transferring of the first information from the staging latch into the other staging latch occurs in the first processor cycle.

7. The method of claim 4, wherein the transferring of the first information from the staging latch to the other staging latch occurs via a multiplexer within a restore pipeline of the processor core.

8. The method of claim 4, wherein in a second processor cycle following the reception of the flush command, first entry data read from the entry latch is driven to the mapper.

9. The method of claim 8, wherein in the second processor cycle a second logical register from the second information in the staging latch is used to read second entry data from the other entry latch of the save-and-restore buffer.

10. The method of claim 9, wherein in a third processor cycle following the reception of the flush command, the second entry data that was read is driven to the mapper.

11. The method of claim 9, wherein in a fourth processor cycle following the reception of the flush command, third entry data that is read from the save-and-restore buffer is driven to the mapper.

12. The method of claim 4, wherein the second instruction is from a most recently dispatched instruction and the first instruction is from a second-most recently dispatched instruction.

13. The method of claim 4, wherein the transferring of the first information from the staging latch into the other staging latch occurs in a direction against a mapper restore direction of a restore pipe.

14. The method of claim 13, wherein the first instruction is from a most recently dispatched instruction and the second instruction is from a second-most recently dispatched instruction.

15. The method of claim 1, further comprising confirming a thread match for the flush command and the first information before beginning the restoration of the mapper with the first information from the staging latch.

16. The method of claim 1, further comprising:
in response to a completion of the first instruction, clearing the first information from the staging latch.

17. The method of claim 1, further comprising:
in response to a completion of a flush corresponding to the flush command, clearing the first information from the staging latch.

18. The method of claim 1, wherein the first instruction is from a most recently dispatched instruction.

19. A processor core for a computer system, wherein the processor core is configured to:
save first information in a staging latch, the first information representing a newly dispatched first instruction of the processor core;
save the first information in an entry latch of a save-and-restore buffer; and
in response to reception of a flush command, begin the restoration of a mapper of the processor core with the first information from the staging latch without waiting for a comparison of a flush tag of the flush command with the entry latch of the save-and-restore buffer.

20. A processor core comprising a dispatch, a mapper, a save-and-restore buffer comprising entry latches and connected to the mapper via at least one pipeline, and a first register disposed in the at least one pipeline, wherein the processor core is configured to:
save first information in the first register, the first information representing a first instruction that is newly dispatched from the dispatch;
save the first information in the entry latches of the save-and-restore buffer; and
in response to reception of a flush command for the processor core, use the first information saved in the first register in the at least one pipeline to restore the first instruction in the mapper.

* * * * *